(12) United States Patent
Mansour et al.

(10) Patent No.: US 11,271,627 B2
(45) Date of Patent: Mar. 8, 2022

(54) IMPLICIT CHANNEL TRACKING FOR SIMULTANEOUS MULTIUSER TRANSMISSION

(71) Applicant: Intel Corporation, Santa Clara, CA (US)

(72) Inventors: Avi Mansour, Givat Shmuel (IL); Shimon Ziv Avital, Kadima (IL); Yaron Alpert, Hod Hasharon (IL)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 16/727,347

(22) Filed: Dec. 26, 2019

(65) Prior Publication Data

US 2020/0136699 A1 Apr. 30, 2020

(51) Int. Cl.
*H04B 7/06* (2006.01)
*H04B 7/0417* (2017.01)
*H04W 74/08* (2009.01)
*H04W 72/04* (2009.01)
*H04L 5/00* (2006.01)
*H04B 7/0456* (2017.01)

(52) U.S. Cl.
CPC ......... *H04B 7/0617* (2013.01); *H04B 7/0417* (2013.01); *H04B 7/0456* (2013.01); *H04L 5/0007* (2013.01); *H04W 72/0413* (2013.01); *H04W 74/0816* (2013.01)

(58) Field of Classification Search
CPC .. H04B 7/0617; H04B 7/0417; H04B 7/0626; H04B 7/0452; H04B 7/0619; H04B 7/0634; H04B 7/0695; H04B 7/0621; H04L 5/0007; H04W 84/12; H04W 72/085; H04W 16/28; H04W 72/0413; H04W 74/0816
See application file for complete search history.

(56) References Cited

U.S. PATENT DOCUMENTS

| 8,295,263 | B1* | 10/2012 | Chen | H04L 1/16 370/345 |
| 10,659,130 | B2* | 5/2020 | Zhang | H04L 25/0204 |
| 2007/0230373 | A1* | 10/2007 | Li | H04B 7/0617 370/267 |
| 2010/0208781 | A1* | 8/2010 | Wentink | H04B 7/0617 375/219 |

(Continued)

OTHER PUBLICATIONS

IEEE, "Draft Standard for Information techonology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax/D4.0, Feb. 2019 (amendment to IEEE P802.11REVmd/D2.0), LAN/MAN Standards Committee of the IEEE Computer Society, New York, New York, 746 pages.

(Continued)

*Primary Examiner* — Khanh C Tran
(74) *Attorney, Agent, or Firm* — Schwabe, Williamson & Wyatt, P.C.

(57) ABSTRACT

Embodiments of the present disclosure provide for implicit channel tracking for simultaneous multiuser transmissions. Other embodiments may be described and claimed.

20 Claims, 9 Drawing Sheets

(56) References Cited

U.S. PATENT DOCUMENTS

| | | | | |
|---|---|---|---|---|
| 2013/0258971 A1* | 10/2013 | Lee | ................. | H04B 7/0617 |
| | | | | 370/329 |
| 2018/0167177 A1* | 6/2018 | Huang | ................. | H04B 7/0639 |
| 2018/0205443 A1* | 7/2018 | Kumagai | ............. | H04B 7/0686 |
| 2020/0067592 A1* | 2/2020 | Vitthaladevuni | .... | H04B 7/0865 |

OTHER PUBLICATIONS

Khorov et al., "A Tutorial on IEEE 802.11ax High Efficiency WLANs," IEEE Communications Surveys & Tutorials, vol. 21, No. 1, First Quarter 2019, 20 pages.

IEEE, "IEEE Standard for Information technology—Telecommunications and information exchange between systems ocal and metropolitan area networks—Specific requirements, Part 11: Wireless LAN Medium Access Control (MAC) and Physical Layer (PHY) Specifications Amendment 4: Enhancements for Very High Throughput for Operation in Bands below 6 GHz," IEEE Computer Society, LAN/MAN Standards Committee, IEEE Std 802.11ac™—2013, New York, NY, 425 pages.

* cited by examiner

IMPLICIT CHANNEL TRACKING FOR SIMULTANEOUS MULTIUSER TRANSMISSION

FIELD

Embodiments of the present invention relate generally to the technical field of wireless communications.

BACKGROUND

The Institute of Electrical and Electronics Engineers (IEEE) 802.11 standards are expected to support efficient transmission for multiuser (MU) and a single user (SU) beamforming transmutations to transmit to a large number of stations with different link conditions and quality of service (QoS) characteristics.

Multiuser—multiple input multiple output (MU-MIMO) needs a precise estimate of a channel from an access point transmitter to a user's receiver. See, for example, IEEE 802.11 ac-2013-IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz (hereinafter, "IEEE 802.11ac"). This estimate of the channel is needed for the transmitter to select weight factors that reduce mutual interference among different user streams. Currently, channel knowledge is acquired explicitly from the user's receivers. This channel acquisition process has high throughput overhead. Further, the channel can change after a short period of time, which may increase mutual interference between users and deteriorate user reception.

To overcome channel change problems, some systems will have a transmitter explicitly acquire a wireless channel more frequently. However, these systems will increase the associated high overhead of channel acquisition and, therefore, compromise system efficiencies.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details.

In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
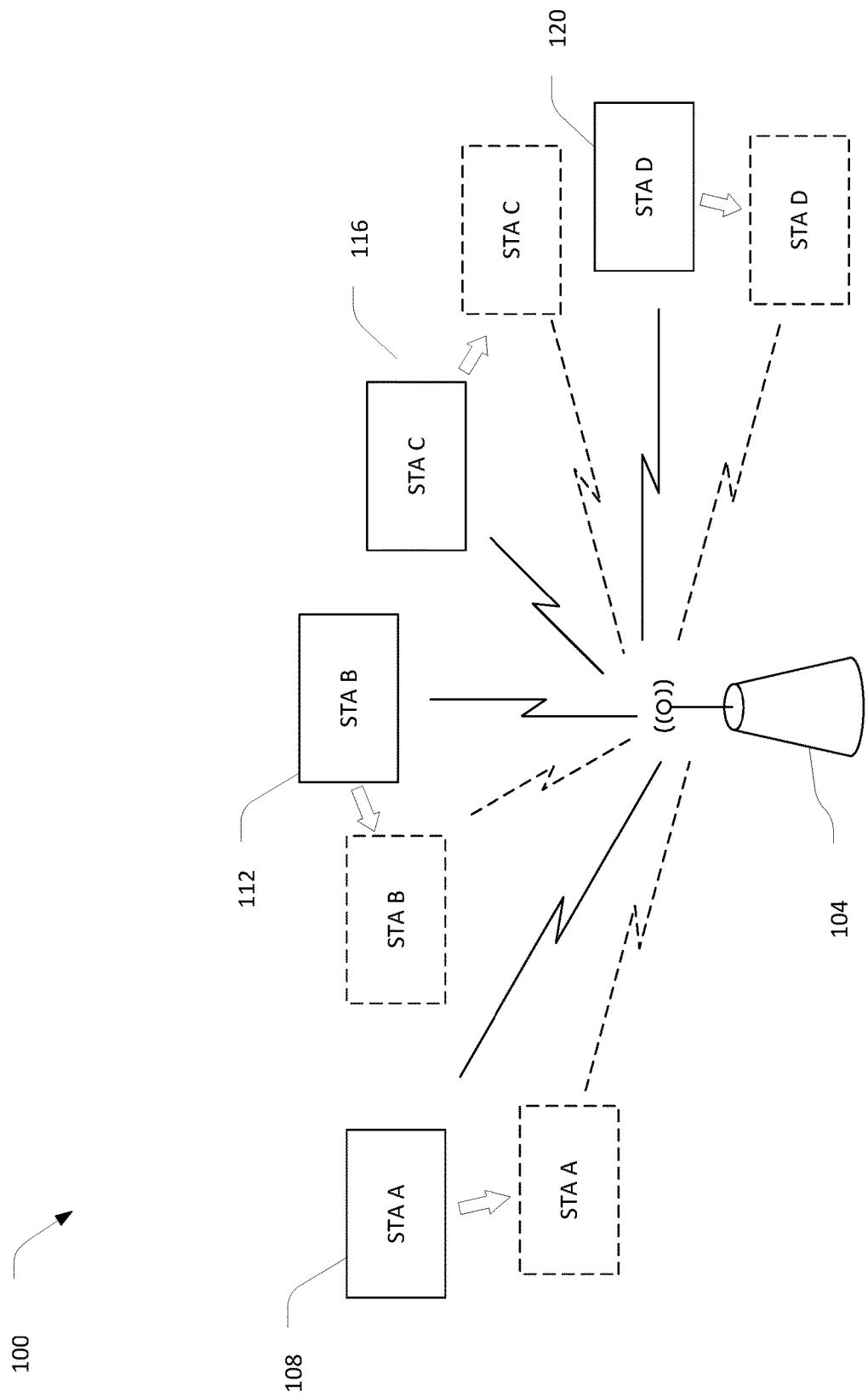
FIG. 1 illustrates a network in accordance with some embodiments.

FIG. 1 illustrates a network 100 in accordance with some embodiments. The network 100 may include an AP 104 communicatively coupled with a plurality of stations (STAs) including, for example, STA A 108, STA B 112, STA C 116, and STA D 120. The network 100 may be a wireless local area network (WLAN) that is compatible with IEEE 802.11 protocols. In some embodiments, the network 100 may also be referred to as a basic service set (BSS). In some embodiments, the AP 104 and STAs may communicate based on high-efficiency wireless (HEW) protocols defined in, for example, IEEE 802.11ax D4.0, February 2019-IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN (hereinafter "IEEE 802.11ax"). STAs operating based on high-efficiency (HEW) protocols may also be referred to as HEW or high-efficiency (HE) STAs.

In some embodiments, the AP 104 may generate transmissions to the plurality of the STAs of the network by multiplexing the transmissions in a frequency domain. The AP 104 may include the transmissions to multiple users in a multiuser packet, for example, a MU high-efficiency—physical layer convergence procedure protocol data unit (HE-PPDU), that is transmitted in a downlink transmission.

As briefly described above, multiuser/single user (SU) beamforming relies on channel knowledge used to select weight vectors of a beamforming matrix. This channel knowledge may be acquired explicitly, for example, a receiver may measure a channel and send channel information back to the transmitter. The wireless channel may change over a short period of time and as the channel knowledge ages, it becomes less relevant. Reliance on the older channel knowledge may degrade throughput. The degradation of throughput may be especially evident in multiuser scenarios where outdated channel knowledge can lead to a substantial increase in mutual interference detected by the stations. However, requiring frequent channel feedback may impose significant overhead. Embodiments of the present disclosure improve performance by tracking changes in a channel without relying on substantial channel feedback overhead.

Some embodiments provide for implicit channel tracking for simultaneous multiuser transmissions. Embodiments may use differential measurements between successive transmissions in order to track changes in a channel (including interferences) and may adapt transmission/reception parameters accordingly. The transmitter may implicitly update channel information using original channel knowledge together with information gleaned from transmissions coming back from a receiver without the need to recalibrate the transmitter or receiver.

In some embodiments, the transmitter may use channel reciprocity and may estimate channel changes from a transmission returning from the receiver together with the original channel knowledge. The return transmissions may include, but are not limited to, multiuser uplink acknowledgment information, multiuser uplink data, etc. The transmitter may use the differential channel estimates to modify transmission/reception parameters (for example, coding rate, transmit power allocations, beamforming matrices, etc.) for subsequent transmissions.

The AP 104 may use channel information obtained from a sounding operation to precisely determine a first beamforming matrix to be used to transmit a first MU packet to STAs A-D while they are in a first location. The STAs A-D may move to different locations (shown by dashed lines) and the AP 104 may use subsequent uplink transmissions from the STAs A-D in their new locations to implicitly update the channel information. The AP 104 may then use the updated channel information to determine an updated second beamforming matrix, which may then be used to transmit a second MU packet to the STAs A-D while they are in a second location. This may be done without relying on additional sounding operations (either in the UL or the DL) and may also be done without recalibrating the receiver.

While movement of the STAs A-D may be one cause for a channel to change, a channel may change for a number of other reasons as well. Embodiments of the present disclosure apply equally well regardless of a reason why a channel changes.

Figure 2:
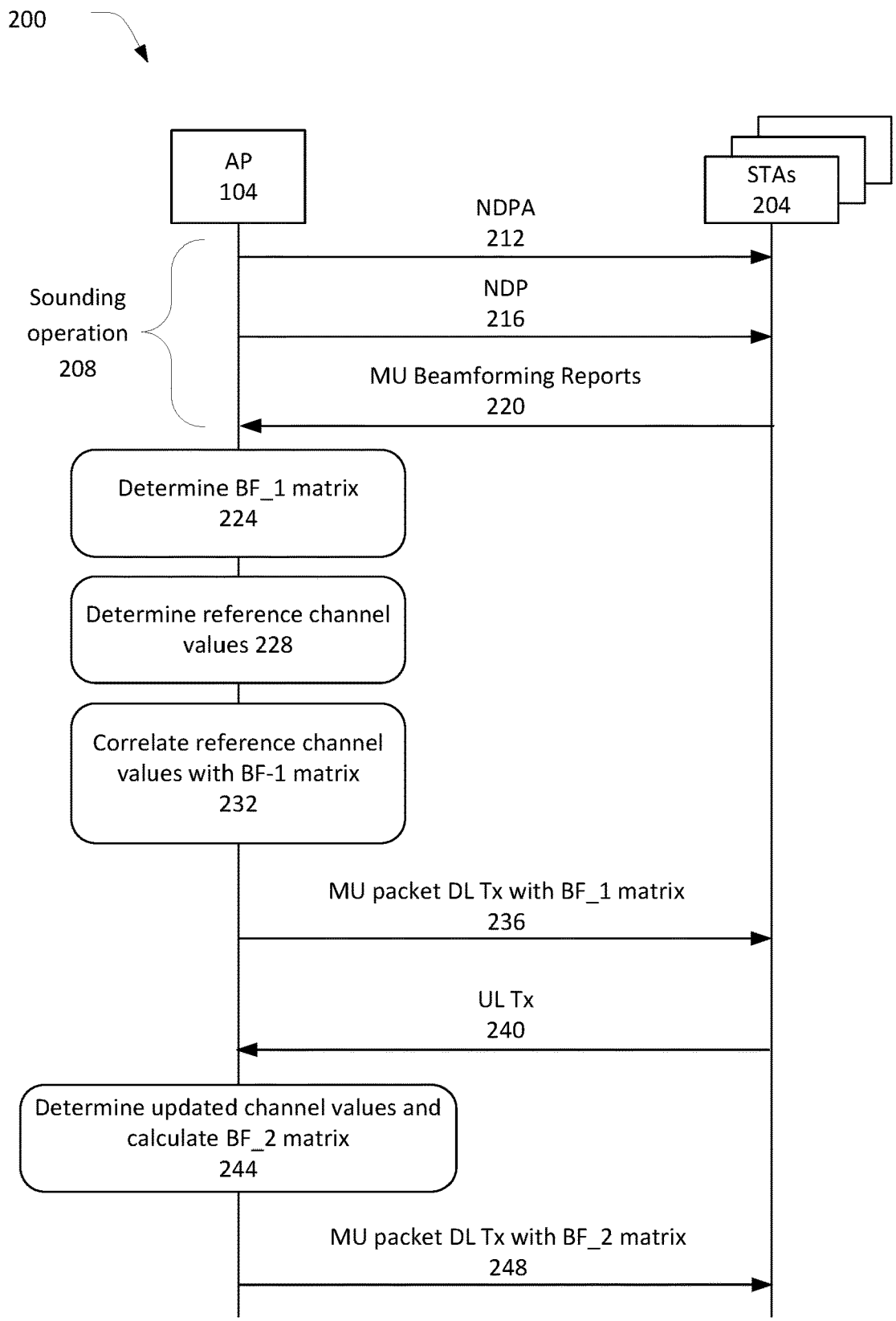
FIG. 2 illustrates a transmission diagram in accordance with some embodiments.

FIG. 2 illustrates a transmission diagram 200 in accordance with some embodiments. The transmission diagram 200 may describe messages and operations performed by AP 104 and stations 204. The stations 204 may include stations similar to, and substantially interchangeable with, the STAs A-D of FIG. 1.

In some embodiments, the AP 204 may perform a sounding operation 208 to acquire a downlink channel for a transmission opportunity (TXOP) period. To perform the sounding operation 208, the AP 104 may transmit a null data packet announcement (NDPA) 212 and, subsequently, a null data packet (NDP) to the stations 204. The stations 204 may measure the NDP and generate feedback information, which is transmitted to the AP 204 in MU beamforming reports 220. In various embodiments, the feedback information may include channel metrics such as an indication of weight vectors to use in a beamforming matrix and signal-to-noise ratios (SNRs) for different subcarriers. Subcarriers may also be referred to as "tones."

The AP 104 may determine a first beamforming (BF_1) matrix based on the feedback information. In some embodiments, AP 104 may also determine a number of other transmission parameters relevant to downlink multiuser transmissions. These other transmission parameters may include, for example, users/stations within a MU OFDMA group, resource unit (RU) allocations, modulation and coding schemes (MCSs), and transmit power allocations.

At 228, the AP 104 may also determine reference channel values based on the MU beamforming reports 220. The determination of the reference channel values may be performed by the receive chain decoding preambles of the MU beamforming reports 220. These reference channel values may provide information of a state of an uplink channel over which the MU beamforming reports 220 are transmitted.

At 232, the AP 104 may correlate the reference channel values with the BF_1 matrix. While the BF_1 matrix is generated based on a state of a downlink channel over which the NDPA/NDP messages were transmitted, the temporal proximity of the NDP/beamforming reports may be sufficient to assume reciprocity between the uplink and downlink channels and, therefore, support the correlation of the reference channel values with the BF_1 matrix.

The AP 104 may construct a MU packet based on the determined transmission parameters and may transmit the MU packet in a downlink transmission with the BF_1 matrix 236.

The STAs 204 may transmit uplink transmissions at 240. These uplink transmissions may include acknowledgment information corresponding to data transmitted in the MU packet at 236. Additionally or alternatively, the uplink transmissions may include uplink data.

At 244, the AP 104 may determine updated channel values and calculate a second beamforming (BF_2) matrix. The updated channel values may be performed by the receive chain decoding preambles of the uplink transmissions transmitted at 240 and may provide information with respect to a state of an uplink channel at a time in which the UL transmissions are sent at 240. The AP 104 may infer a change in the channel values between the reference channel values and the updated channel values may correspond to a respective change in the beamforming matrices. Therefore, the BF_2 matrix may be calculated based on the BF_1 matrix and a relative change between the updated channel values and the reference channel values.

The AP 104 may construct a second multiuser packet and transmit the second multiuser packet in a downlink transmission with the BF_2 matrix at 248. In some embodiments, the construction of the second multiuser packet may be performed with many of the transmission parameters determined based on the sounding operation 208 including, but not limited to, users/stations within a MU OFDMA group, resource unit (RU) allocations, MCSs, and transmit power allocations. However, in some embodiments one or more of these parameters may also be updated based on a relative change between the updated channel values and the reference channel values.

The implicit channel updating as described herein may enable a transmitter to transmit for a longer duration. For example, a transmission opportunity duration may be extended for a specific set of stations. This may be done without the need to explicitly acquire the channel again, for example, by asking users to resend channel information. Embodiments may improve throughput by reducing protocol complexity and overhead; increase downlink (DL)/uplink (UL) MU-MIMO throughput; or increase accuracy of rate tracking with a faster response to channel changes.

The description of transmission diagram 200 is based on an assumption that the AP is performing the implicit channel tracking. However, other embodiments may include a station performing the implicit channel tracking. In such embodiments, the sounding operation may be an uplink sounding operation and the uplink/downlink portions may be reversed. For example, instead of a changes in a DL channel being implicitly tracked based on changes in an UL channel, changes in an UL channel may be implicitly tracked based on changes in a DL channel.

Figure 3A:
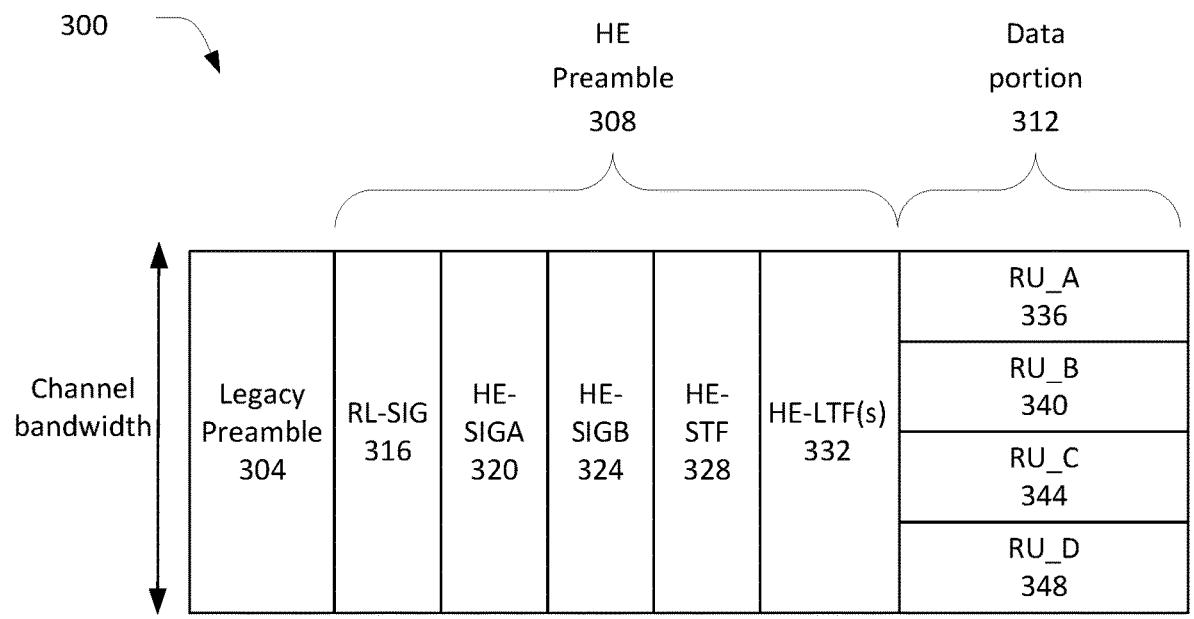
FIGS. 3A-3B illustrate high-efficiency packets in accordance with some embodiments.

FIG. 3A illustrates a multiuser packet 300 that may be generated by the AP 104 and transmitted in a downlink transmission as described in, for example, transmissions at 228 or 248 of FIG. 2.

The multiuser packet 300 may be referred to as a MU HE-PPDU in some embodiments. The multiuser packet 300 may include a legacy preamble 304, a high-efficiency (HE) preamble 308, and a data portion 312. The legacy preamble 304 and the HE preamble 308 may span a channel bandwidth. The channel bandwidth may be 20 megahertz (MHz), 40 MHz, 80 MHz, 80+80 MHz, or 160 MHz in some embodiments.

The legacy preamble 304 may be used for backward compatibility and may be decodable by legacy stations. The legacy preamble 304 may include training fields, for example, legacy—short training field (L-STF) and legacy—long training field (L-LTF), to synchronize transmitter and receiver. The legacy preamble 304 may further include a legacy—signal field (L-SIG) to allow a receiving station to determine a transmission time of the multiuser packet. In some embodiments, the L-SIG field may have a length that indicates that the packet is a HE packet with a MU preamble.

The HE preamble 308 may include a repeated legacy—signal field (RL-SIG) 316, a HE signal—A field (HE-SIG-A) 320, HE signal-B field (HE-SIG-B) 324, and one or more training fields, for example, HE-STF 328 or HE-LTF 332.

The RL-SIG 316 may facilitate detection by providing repetition/L-SIG validity checks.

The HE-SIG-A 320 may include common transmission parameters for the users having data within the data portion 312 of the multiuser packet 300. In some embodiments, the HE-SIG-A 320 may provide information regarding MCSs, bandwidth, number of spatial streams, and other parameter information to allow a receiver to correctly decode the multiuser packet 300. The HE-SIG-A 320 may provide information regarding a network color, remaining TxOP duration, whether the frame is UL or DL, etc.

The HE-SIG-B field may include RU allocation information and per-user signaling parameters for the users having data within the data portion 314. The per-user signaling parameters may include MCSs, number of streams, etc. for each resource unit.

The HE-STF 328 and HE-LTF 332 may be used for tuning the transmitter/receiver for MIMO transmissions. The HE-STF 328 may be used to improve automatic gain control estimation in a MIMO transmission, and the HE-LTF 332 may allow a receiver to estimate the MIMO channel between a set of constellation mapper outputs and the receive chains.

The data portion 312 may include RUs assigned to stations of the OFDMA group. In this embodiment, the OFDMA group determined by the AP 104 may include STAs A-D of FIG. 1 with each station being assigned a respective RU. For example, STA A 108 may be assigned RU_A 336, STA B 112 may be assigned RU_B 340, STA C 116 may be assigned RU_C 344, and STA D 120 may be assigned RU_D 348.

Figure 3B:
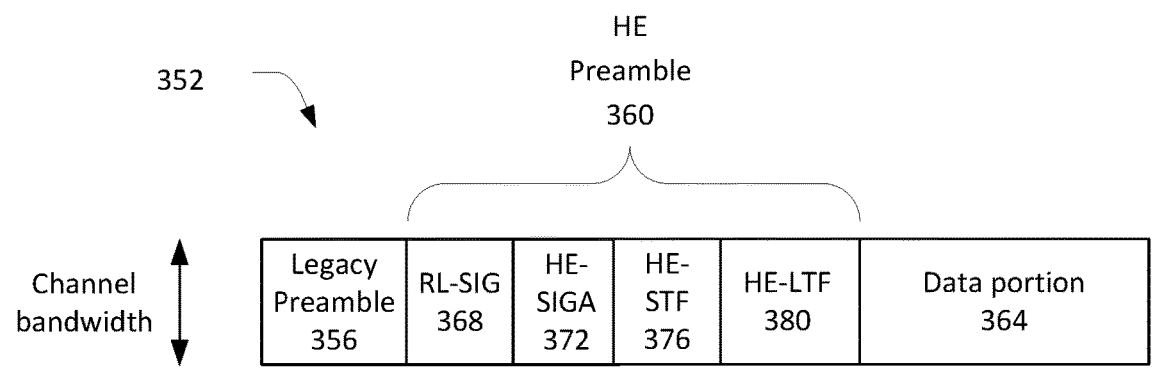

FIG. 3B illustrates a packet 352 that may be generated by a station and transmitted in an uplink transmission as described in, for example, transmissions at 232 or 240 of FIG. 2.

The packet 352 may include a legacy preamble 356, a HE preamble 360, and a data portion 364. The HE preamble 360 may include an RL-SIG 368, HE-SIG A 372, HE-STF 376, and HE-LTF 380. In general, the fields within the packet 352 may be similar to the like-named fields described with respect to multiuser packet 300. The data portion 364 may include acknowledgment information or uplink data.

In some embodiments, a receiver of the AP 104 may use the HE-LTF 380 as the basis for determining reference channel values at 228 and the updated channel values at 244.

Figure 4:
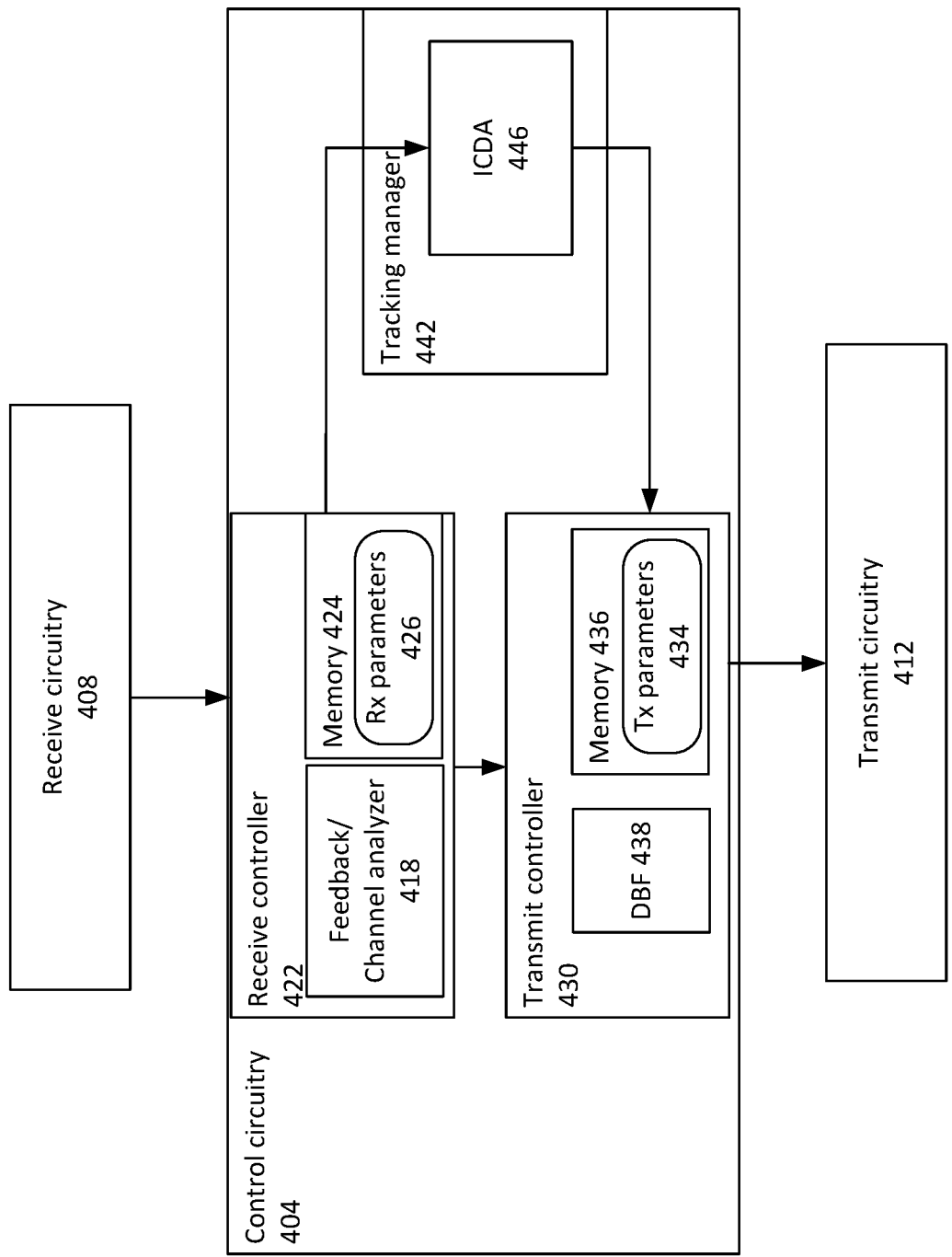
FIG. 4 illustrates signal processing circuitry in accordance with some embodiments.

FIG. 4 illustrates signal processing circuitry 400 in accordance with some embodiments. The signal processing circuitry 400 may be included in the AP 104 or a station in accordance with some embodiments.

The signal processing circuitry 400 may include a control circuitry 404 that includes processor/memory circuitry to execute elements of a protocol stack including, for example, physical (PHY) and media access control (MAC) layer functionality. The control circuitry 404 may be coupled with receive circuitry 408 and transmit circuitry 412

As used herein, the term "circuitry" may refer to, be part of, or include hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The receive circuitry 408 may include analog/digital components designed to extract control/data from signals received by the signal processing circuitry 400. The components may include, but are not limited to, decoders, demodulators, filters, low-noise amplifiers (LNA), switches, receive beamforming circuitry, processing circuitry, etc.

The receive circuitry 408 may be coupled with a receive controller 422 of the control circuitry 404. The receive controller 422 may include a feedback/channel analyzer 418 and memory 424 to store receive parameters 426. In some embodiments, the receive circuitry 408 and the receive controller 422 may be collectively referred to as "receiver."

The receive parameters 426 may configure the components of the receive circuitry 408 to be in a first receive state for receiving signals. For example, the receive parameters 426 may set a gain of a low-noise amplifier (LNA), provide a receive-beamforming matrix for beamforming components of the receive circuitry 408, etc.

The feedback/channel analyzer 418 may extract feedback information from received signals from the receive circuitry 408. For example, the signals received by the feedback/channel analyzer 418 may be beamforming reports, for example, MU beamforming reports 220, which may include feedback information that includes information relevant to a state of a channel over which corresponding sounding signals were transmitted.

The feedback/channel analyzer 418 may provide feedback information to a transmit controller 430. The transmit controller 430 may determine and store transmit parameters 434 in memory 436. The transmit parameters 434 may be used to configure transmit circuitry 412 for transmission of a signal. In some embodiments, the transmit parameters 434 may include users/stations within a MU OFDMA group, RU allocations, MCSs, transmit power allocations, and beamforming matrices.

The transmit controller 430 may include a digital beamforming block (DBF) 438 that employs digital signal processing algorithms to process channel information and compute a beamforming matrix that is stored in the transmit parameters 434. The channel information may include explicit channel information (for example, information about a channel acquired through a sounding operation) or implicit channel information (for example, information about a change in channel values corresponding to reciprocal channel). The beamforming matrix may be provided to beamforming components in the transmit circuitry 412. The beamforming components may apply the beamforming matrix to a transmitted signal to improve reception at designated receivers. This may be achieved by combining elements in a phased antenna array in a manner to exploit constructive and destructive signal interference experienced by the receivers.

In addition to the beamforming components, the transmit circuitry 412 may include additional analog/digital components (for example, encoders, modulators, mappers, filters, power amplifiers, switches, processing circuitry, etc.) to generate and transmit the signals. In some embodiments, the transmit circuitry 412 and the transmit controller 430 may be collectively referred to as "transmitter."

The feedback/channel analyzer 418 may additionally/alternatively determine channel values that indicate a state of a channel over which signals are received by an AP/STA that implements the signal processing circuitry 400. The signals may include, for example, the MU beamforming reports 220 or the UL transmission 240. In some embodiments, the feedback/channel analyzer 418 may decode a preamble of the received signals (for example, an HE-LTF field of an uplink packet) to determine the channel values, which may include reference channel values or updated channel values as described herein.

The receive controller 422 may provide a tracking manager 442 with the channel values determined by the feedback/channel analyzer 418. The tracking manager 442 may include an implicit channel difference analyzer (ICDA) 446. The ICDA 446 may compare updated channel values to reference channel values to determine a change in a state of the channel. The ICDA 446 may provide an indication of the change in the channel state to the transmit controller 430 as channel information. The DBF 438 may then update the beamforming matrix within the transmit parameters 434 to reflect an estimate of the changed channel.

Figure 5:
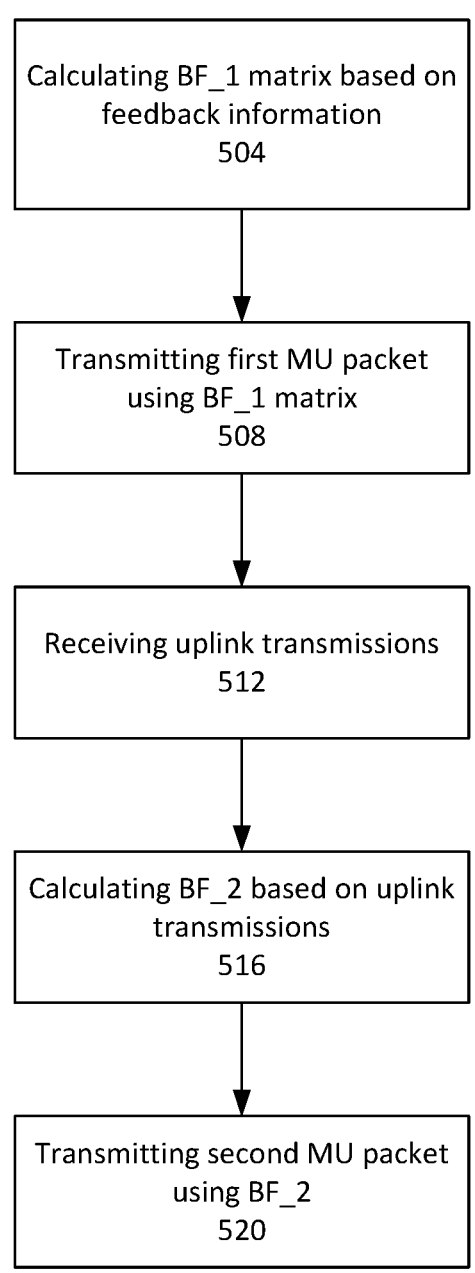
FIG. 5 illustrates an operation flow/algorithmic structure in accordance with some embodiments.

FIG. 5 illustrates an operation flow/algorithmic structure 500 in accordance with some embodiments. The operation flow/algorithmic structure 500 may be implemented by an access point, for example, access point 104 or components thereof, for example, signal processing circuitry 400. In some embodiments, the operation flow/algorithmic structure 500 may be modified to be performed by a STA or components thereof.

At 504, the operation flow/algorithmic structure 504 may include calculating BF_1 matrix based on feedback information. The feedback information may be obtained upon acquisition of a channel. For example, the feedback information may include beamforming vectors and SNRs transmitted by STAs A-D in the MU beamforming reports 220.

At 508, the operation flow/algorithmic structure 500 may further include transmitting a first multiuser packet using BF_1 matrix. In some embodiments, the transmitting of the first multiuser packet using the BF_1 matrix may include a DBF controlling beamforming components in a transmit chain to provide a directional transmission to stations having data in the first multiuser packet.

At 512, the operation flow/algorithmic structure 500 may further include receiving uplink transmissions. A receiver of an access point may receive and process the uplink transmissions as described herein. The uplink transmissions received at 512 may include first uplink transmissions that may serve as a basis for determining reference channel values. In some embodiments, a receiver may determine the reference channel values by decoding/measuring preambles of the first uplink transmissions. The first uplink transmissions may be transmissions sent during a sounding operation (for example, MU beamforming reports 220) or other UL transmissions including, for example, data or acknowledgment information. The reference channel values may correspond to a first state of an uplink channel over which the first uplink transmissions are transmitted.

The uplink transmissions received at 512 may further include second uplink transmissions, which may be received after a period of time has elapsed since receipt of the first uplink transmissions. The second uplink transmissions may serve as a basis for determining updated channel values. The receiver may determine the updated channel values in a manner similar to that described above with respect to the reference channel values. The second uplink transmissions may include data or acknowledgment information. The updated channel values may correspond to a second state of the uplink channel over which the second uplink transmissions are transmitted.

At 516, the operation flow/algorithmic structure 500 may further include calculating BF_2 matrix based on the uplink transmissions. The calculation of the BF_2 matrix may be based on a change in the channel values determined from receiving of the uplink transmissions at 512. In particular, the access point may infer that a change in an uplink channel (determined by comparing the updated channel values to the reference channel values) may correspond to a similar change in the downlink channel. The access point may then use this change in the downlink channel as a basis for updating the beamforming matrix from the BF_1 matrix to the BF_2 matrix.

At 520, the operation flow/algorithmic structure 500 may further include transmitting the second multiuser packet using BF_2 matrix. In some embodiments, the transmitting of the second multiuser packet using the BF_2 matrix may include the DBF controlling beamforming components in the transmit chain to provide a directional transmission to stations having data in the second multiuser packet.

Figure 6:
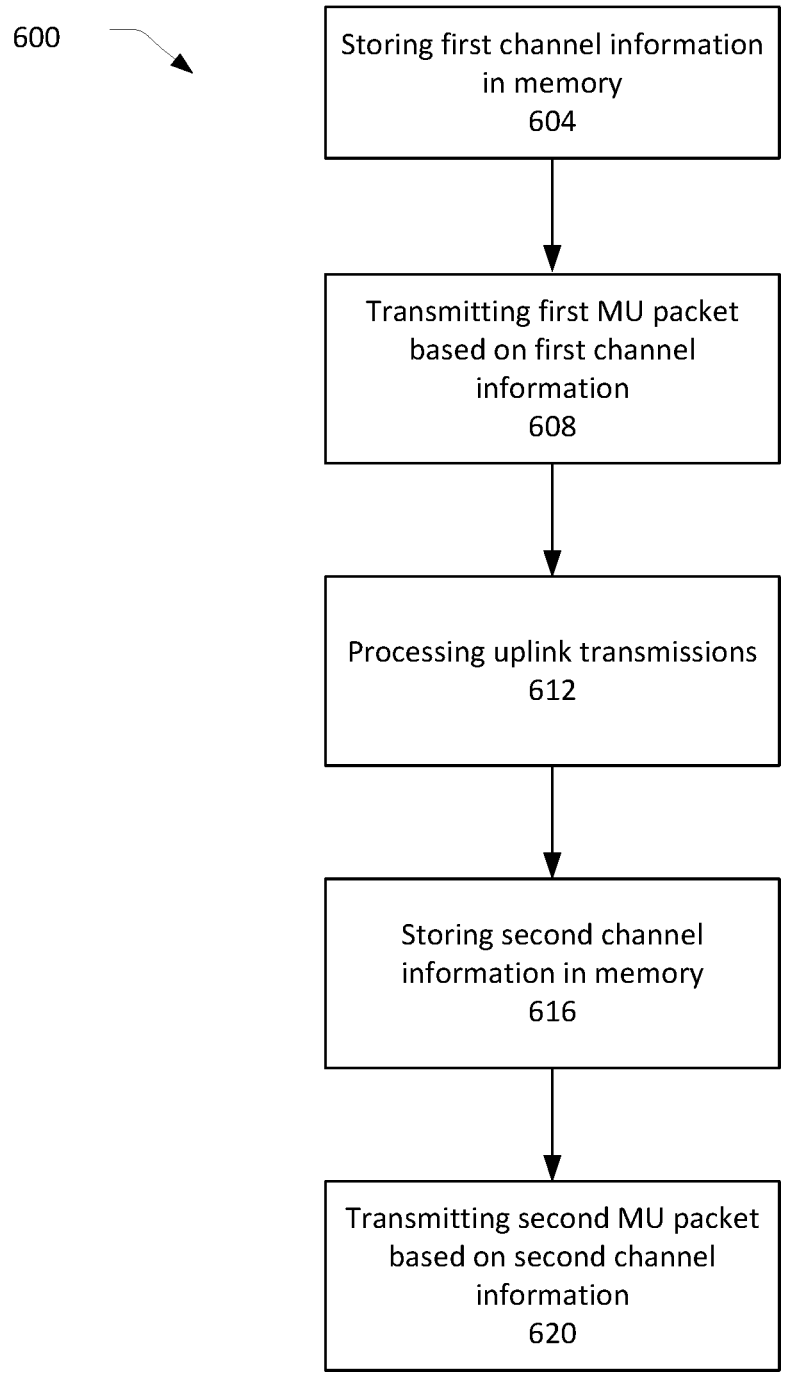
FIG. 6 illustrates an operation flow/algorithmic structure in accordance with some embodiments.

FIG. 6 illustrates an operation flow/algorithmic structure 600 in accordance with some embodiments. The operation flow/algorithmic structure 600 may be implemented by an access point, for example, access point 104 or components thereof, for example, signal processing circuitry 400. In some embodiments, the operation flow/algorithmic structure 600 may be modified to be performed by a STA or components thereof.

At 604, the operation flow/algorithmic structure 604 may include storing first channel information in memory. In some embodiments, the first channel information may include channel metrics obtained from the feedback information transmitted during a sounding operation used to acquire a downlink channel for a transmission opportunity. In some embodiments, the first channel information may include weight vectors, SNR information, etc.

At 608, the operation flow/algorithmic structure 600 may further include transmitting a first multiuser packet based on the first channel information. In some embodiments, the first channel information may be used as a basis for determining first transmission parameters, including a first beamforming matrix, coding rate, etc. The transmission of the first multiuser packet may then be accomplished using the first transmission parameters.

At 612, the operation flow/algorithmic structure 600 may further include receiving uplink transmissions. The uplink transmissions may include first uplink transmissions and second uplink transmissions from stations, including stations to which the first multiuser packet was sent. In some embodiments, receiving the uplink transmissions may be performed by setting components of the receive chain to be in a first receive state to receive both the first and second uplink transmissions. For example, the receive controller 422 may set receive parameters 426 to be the same while the access point receives the first and second uplink transmissions. Thus, the receiver may not be recalibrated between receipt of the uplink transmissions.

At 616, the operation flow/algorithmic structure 600 may further include storing second channel information in memory. In some embodiments, the second channel information may be determined based on the uplink transmissions.

The second channel information may be determined by the access point implicitly tracking a downlink channel based on an uplink channel state change. The uplink channel state change may be determined based on the first/second uplink transmissions. For example, the access point may determine a first UL channel state based on the first uplink transmissions and determine a second UL channel state based on the second uplink transmissions. The access point may then determine an uplink channel state change based on the first and second UL channel states. The access point may infer reciprocity between the first UL and DL channel states and may also further infer reciprocity between second UL and DL channel states. Thus, the access point may infer a DL channel state change similar to the UL channel state change. The access point may then determine the second channel information based on the DL channel state change and the first channel information.

At 620, the operation flow/algorithmic structure 600 may further include transmitting the second multiuser packet based on the second channel information. In some embodiments, the second channel information may be used as a basis for determining second transmission parameters including a second beamforming matrix, coding rate, etc. The transmission of the second multiuser packet may then be accomplished using the second transmission parameters.

Figure 7:
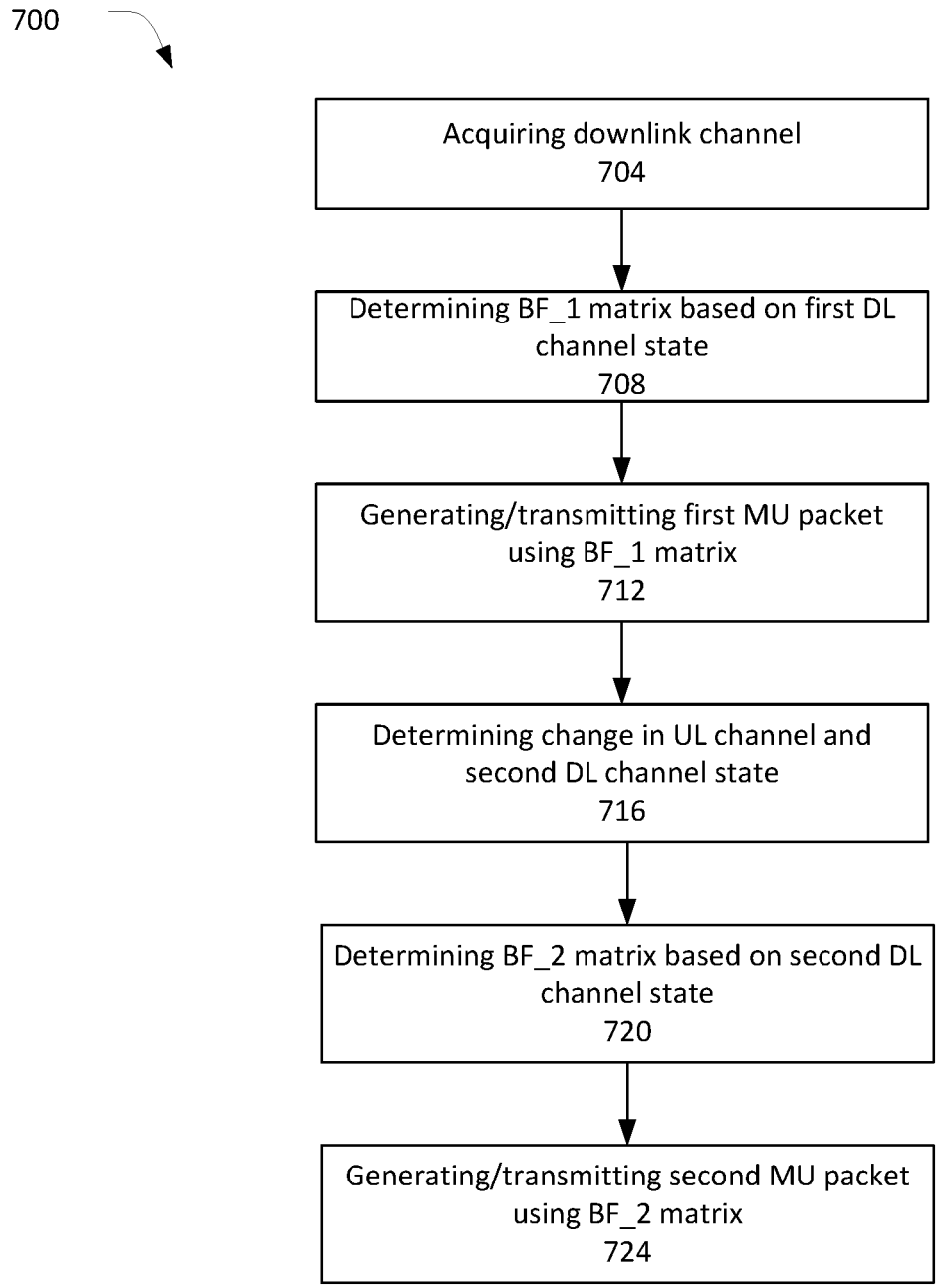
FIG. 7 illustrates an operation flow/algorithmic structure in accordance with some embodiments.

FIG. 7 illustrates an operation flow/algorithmic structure 700 in accordance with some embodiments. The operation flow/algorithmic structure 700 may be implemented by an access point, for example, access point 104 or components thereof, for example, signal processing circuitry 400. In some embodiments, the operation flow/algorithmic structure 700 may be modified to be performed by a STA or components thereof.

At 704, the operation flow/algorithmic structure 704 may include acquiring a downlink channel. The acquisition of the downlink channel may be accomplished by performing a sounding operation. The sounding operation may include transmitting NPD packets and receiving feedback information in MU beamforming reports. The feedback information may include information from stations based on their receipt of the NPD packets. This information may provide an indication of a first DL channel state.

At 708, the operation flow/algorithmic structure 700 may further include determining a BF_1 matrix based on the first DL channel state. In some embodiments, the information received from the stations during the sounding operation may include weight vectors that may form the BF_1 matrix.

At 712, the operation flow/algorithmic structure 700 may further include generating and transmitting a first MU packet using the BF_1 matrix. In some embodiments, the transmitting of the first MU packet using the BF_1 matrix may include a DBF controlling beamforming components in a transmit chain to provide a directional transmission to stations having data in the first MU packet.

At 716, the operation flow/algorithmic structure 700 may further include determining a change in an uplink channel and a second downlink channel state. In some embodiments, the change in the uplink channel may be determined based on reception of a plurality of uplink transmissions from stations in a network. First uplink transmissions from the stations may be measured by the receiver in the access point to establish a reference channel state. The access point may receive the first uplink transmissions as part of, or after, the sounding operation. Second uplink transmissions from the stations may be measured by the receiver in the access point to establish an updated channel state. The change in the uplink channel may be determined by comparing the updated channel state to the reference channel state.

Upon determining the change in the uplink channel, the access point may determine the second downlink channel state by inferring a corresponding change in the downlink channel with reference to the first DL channel state.

At 720, the operation flow/algorithmic structure 700 may further include determining a BF_2 matrix based on the second DL channel state. In some embodiments, the BF_2 matrix may be generated with weight vectors better suited to the second DL channel state.

At 724, the operation flow/algorithmic structure 700 may further include generating and transmitting a second multiuser packet using the BF_2 matrix. In some embodiments, the transmitting of the second MU packet using the BF_2 matrix may include a DBF controlling beamforming components in a transmit chain to provide a directional transmission to stations having data in the second MU packet. In this manner, the access point may change the direction of the transmission beams to more accurately target stations that may have moved since the sounding operation occurred.

Figure 8:
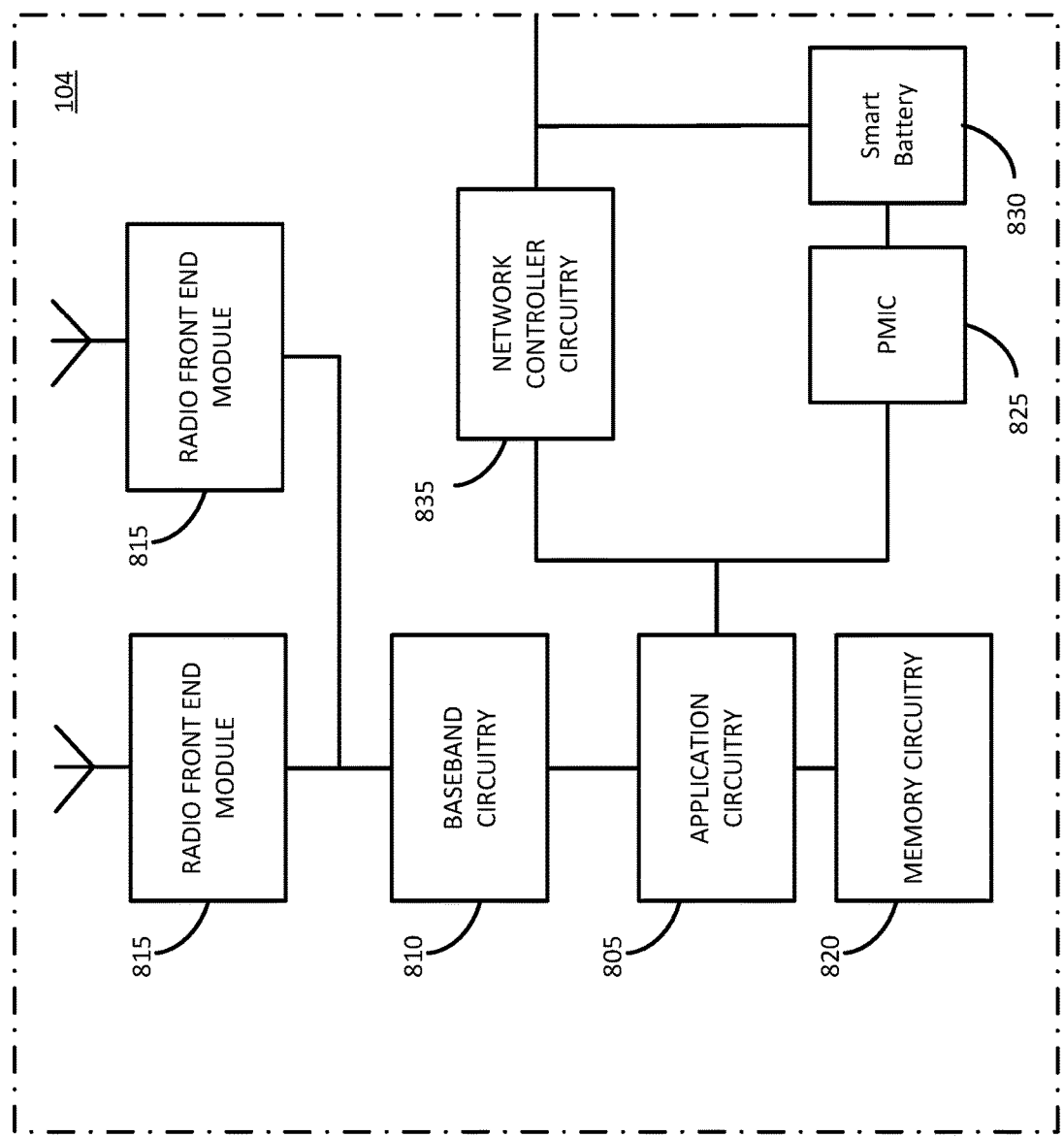
FIG. 8 illustrates an example device in accordance with various embodiments.

FIG. 8 illustrates an example of a device 800 in accordance with various embodiments. The device 800 may be an AP, for example, AP 104, or a STA, for example, one of STAs A-D of FIG. 1. The device 800 may include one or more of application circuitry 805, baseband circuitry 810, one or more radio front end modules 815, memory circuitry 820, power management integrated circuitry (PMIC) 825, and network controller circuitry 835.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 805 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the AP 84 may not utilize application circuitry 805, and instead may include a special-purpose processor/controller to process IP data received from network core, for example.

Additionally or alternatively, application circuitry 805 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry (for example, signal processing circuitry 400) with one or more instances of control circuitry (not shown) to provide control functions for the digital baseband circuitry and/or radio frequency circuitry (e.g., the radio front end modules 815).

The radio front end modules (RFEM) 815 may include radio frequency integrated circuits (RFICs), amplifiers (for example, power amplifiers and low-noise amplifiers), and antenna elements to effectuate over-the-air transmissions. The RFEM 815 may include beamforming circuitry to increase transmission/reception directivity.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the device 800 using a physical connection, which may be electrical (commonly referred to as a "copper interconnect"), optical, or wireless. The network controller circuitry 835 may include one or more dedicated processors and/or FPGAs to communicate using one or more of the aforementioned protocols. In some implementations, the network controller circuitry 835 may include multiple controllers to provide connectivity to other networks using the same or different protocols.

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 9:
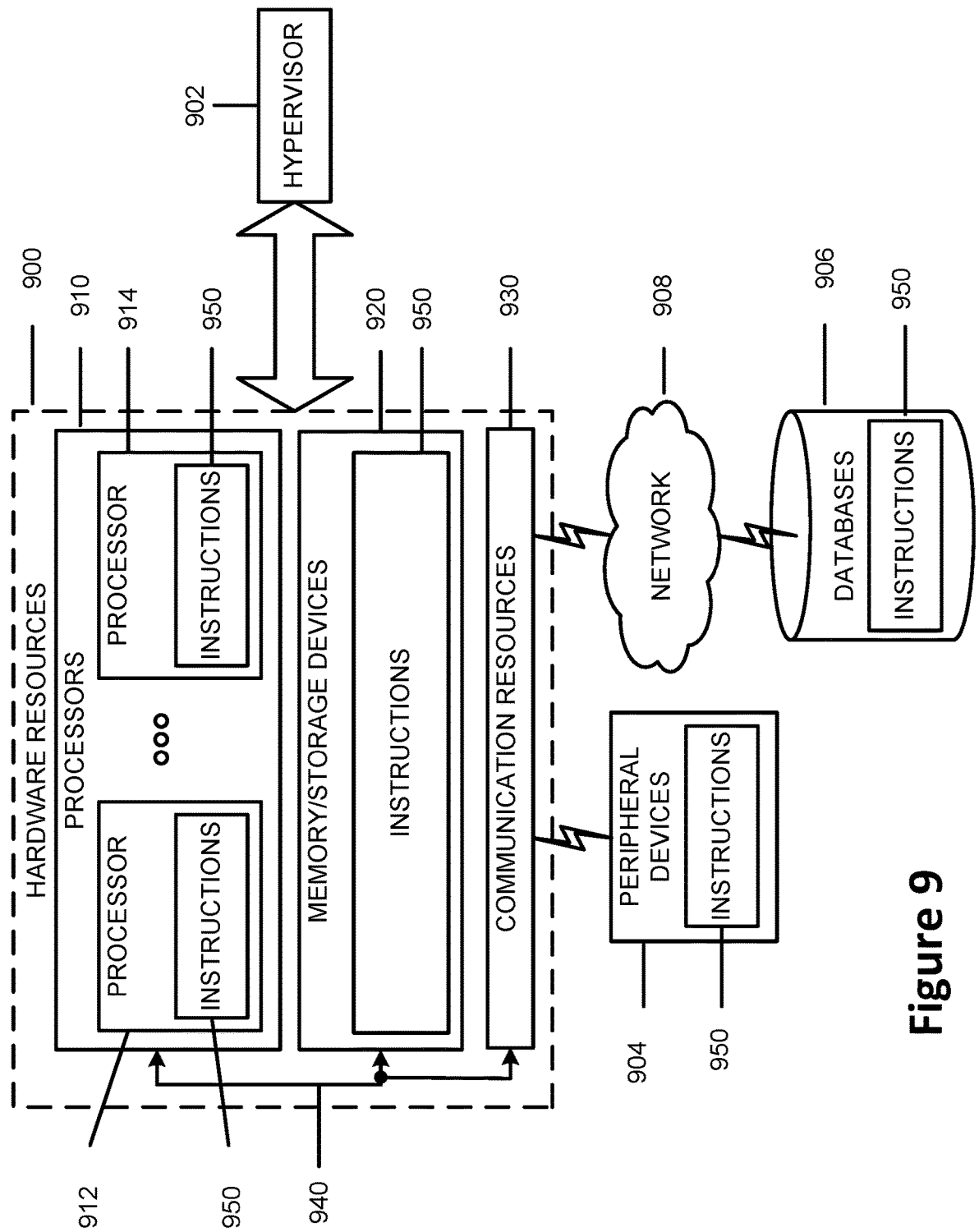
FIG. 9 is a block diagram illustrating components, according to some example embodiments, able to read instructions from a machine-readable or computer-readable medium (for example, a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 902 may be executed to provide an execution environment for one or more network slices/sub-slices to utilize the hardware resources 900. A "virtualized resource" may refer to compute, storage, and/or network resources provided by virtualization infrastructure to an application, device, system, etc.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 914.

The memory/storage devices 920 may include main memory, disk storage, or any suitable combination thereof. The memory/storage devices 920 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 950 may comprise software, a program, an application, an applet, an app, or other executable code for causing at least any of the processors 910 to perform any one or more of the methodologies discussed herein. For example, the instructions 950 may cause one or more of the processors 910 to implicitly track a channel for updating transmissions within a transmission opportunity duration as described herein.

The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method of operating an access point, the method comprising: calculating a first beamforming matrix based on feedback information received from a sounding operation; transmitting a first multiuser packet using the first beamforming matrix, the first multiuser packet to include data to be transmitted to a plurality of stations of an orthogonal frequency division multiple access (OFDMA) group; receiving, from the plurality of stations, uplink transmissions; calculating a second beamforming matrix based on the uplink transmissions; and transmitting a second multiuser packet using the second beamforming matrix.

Example 2 may include the method of example 1 or some other example herein, wherein the uplink transmissions include acknowledgment information with respect to data within the first multiuser packet.

Example 3 may include the method of example 1 or some other example herein, wherein the method further comprises performing the sounding operation to acquire a channel for a transmission opportunity duration.

Example 4 may include the method of example 3 or some other example herein, wherein said transmitting the second multiuser packet is within the transmission opportunity duration.

Example 5 may include the method of example 3 or some other example herein, wherein the first beamforming matrix corresponds to a first state of the channel within a first portion of the transmission opportunity duration and the second beamforming matrix corresponds to a second state of the channel within a second portion of the transmission opportunity duration.

Example 6 may include the method of example 1 or some other example herein, wherein the uplink transmissions include first uplink transmissions and second uplink transmissions, wherein calculating the second beamforming matrix comprises: determining reference channel values based on the first uplink transmissions; determining updated channel values based on the second uplink transmissions; and calculating the second beamforming matrix based on the updated channel values.

Example 7 may include the method of example 6 or some other example herein, wherein the method further comprises controlling a receive chain to receive both the first and the second uplink transmissions with a first receive state.

Example 8 may include the method of example 6 or some other example herein, further comprising: correlating the reference channel values to the first beamforming matrix; and calculating the second beamforming matrix based further on the correlation of the reference channel values to the first beamforming matrix.

Example 9 may include the method of example 8 or some other example herein, further comprising: calculating the second beamforming matrix based on an inference that a change from the reference channel values to the updated channel values corresponds to a change from the first beamforming matrix to the second beamforming matrix.

Example 10 may include a method comprising: storing first channel information based on feedback from a plurality of stations of a wireless local area network in response to one or more reference signals; transmitting a first multiuser packet to the plurality of stations based on the first channel information; processing uplink transmissions received from the plurality of stations; storing second channel information based on the uplink transmissions; and transmitting a second multiuser packet based on the second channel information, wherein the first channel information corresponds to a downlink channel within a first portion of a transmission opportunity and the second channel information corresponds to the downlink channel within a second portion of the transmission opportunity.

Example 11 may include the method of example 10 or some other example herein, further comprising performing a sounding operation to acquire the downlink channel for the transmission opportunity.

Example 12 may include the method of example 10 or some other example herein, wherein the uplink transmissions includes user uplink data or includes acknowledgment information with respect to data transmitted in the first multiuser packet.

Example 13 may include the method of example 10 or some other example herein, wherein the uplink transmissions include first uplink transmissions and second uplink transmissions and the method further comprises: determining a first uplink (UL) channel state based on the first uplink transmissions; determining a second UL channel state based on the second uplink transmissions; determining an UL channel state change based on the first UL channel state and the second UL channel state; determining a downlink (DL) channel state change based on the UL channel state change; and determining the second channel information based on the DL channel state change.

Example 14 may include the method of example 13 or some other example herein, further comprising setting components of a receive chain to be in a first receive state to receive both the first and second uplink transmissions.

Example 15 may include the method of example 10 or some other example herein, further comprising: generating first transmission parameters based on the first channel information; and generating second transmission parameters based on the second channel information.

Example 16 may include the method of example 15 or some other example herein, wherein the first transmission parameters includes a first beamforming matrix or coding rate and the second transmission parameters includes a second beamforming matrix or coding rate.

Example 17 may include a method comprising generating application data to be transmitted to a plurality of stations; acquiring a downlink channel for a transmission opportunity; determining a first beamforming matrix based on a first state of the downlink channel as indicated in feedback information in multiuser beamforming reports received during acquisition of the downlink channel; generating a first multiuser packet to be transmitted using the first beamforming matrix; determining a change in an uplink channel based on a plurality of uplink transmissions; determining a second state of the downlink channel based on the change in the uplink channel; determining a second beamforming matrix based on the second state of the downlink channel; generating a second multiuser packet to be transmitted using the second beamforming matrix; and transmitting the first and second multiuser packets within the transmission opportunity.

Example 18 may include the method of example 16 or some other example herein, wherein the plurality of uplink transmissions include first uplink transmissions and second uplink transmissions and the method further comprises: determining reference channel values based on the first uplink transmissions; determining updated channel values based on the second uplink transmissions; and determining the change in the uplink channel based on a comparison of the reference channel values to the updated channel values.

Example 19 may include the method of example 16 or some other example herein, further comprising controlling a receive chain of the radio front end module to receive the first and second uplink transmissions with a first receive state.

Example 20 may include the method of example 16 or some other example herein, further comprising: correlating the reference channel values to the first beamforming matrix; and calculating the second beamforming matrix based further on the correlation of the reference channel values to the first beamforming matrix.

Example 21 may include the method of example 16 or some other example herein, wherein the plurality of uplink transmissions include first uplink transmissions and second uplink transmissions and the method further comprises: determining reference channel values based on the first uplink transmissions; determining an updated reference channel values based on the second uplink transmissions; and determining the change in the uplink channel based on a comparison of the updated channel values to the reference channel values.

Example 22 may include the method of example 21 or some other example herein, wherein the first uplink transmissions include the multiuser beamforming reports.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a signal in a wireless network as shown and described herein.

Example 30 may include a method of communicating in a wireless network as shown and described herein.

Example 31 may include a system for providing wireless communication as shown and described herein.

Example 32 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed by one or more processors, cause an access point to:
   calculate a first beamforming matrix based on feedback information received from a sounding operation;
   transmit a first multiuser packet using the first beamforming matrix, the first multiuser packet to include data to be transmitted to a plurality of stations of an orthogonal frequency division multiple access (OFDMA) group;
   receive, from the plurality of stations, uplink transmissions, wherein the uplink transmissions include first uplink transmissions and second uplink transmissions;
   determine reference channel values based on the first uplink transmissions;
   determine updated channel values based on the second uplink transmissions;
   calculate a second beamforming matrix based on the updated channel values; and
   transmit a second multiuser packet using the second beamforming matrix.

2. The one or more non-transitory, computer-readable media of claim 1, wherein the uplink transmissions include acknowledgment information with respect to data within the first multiuser packet.

3. The one or more non-transitory, computer-readable media of claim 1, wherein the instructions, when executed, further cause the access point to:
   perform the sounding operation to acquire a channel for a transmission opportunity duration.

4. The one or more non-transitory, computer-readable media of claim 3, wherein said transmission of the second multiuser packet is within the transmission opportunity duration.

5. The one or more non-transitory, computer-readable media of claim 3, wherein the first beamforming matrix corresponds to a first state of the channel within a first portion of the transmission opportunity duration and the second beamforming matrix corresponds to a second state of the channel within a second portion of the transmission opportunity duration.

6. The one or more non-transitory, computer-readable media of claim 1, wherein the instructions when executed, further cause the access point to: control a receive chain to receive both the first and the second uplink transmissions with a first receive state.

7. The one or more non-transitory, computer-readable media of claim 1, wherein the instructions, when executed, further cause the access point to:
   correlate the reference channel values to the first beamforming matrix; and
   calculate the second beamforming matrix based further on the correlation of the reference channel values to the first beamforming matrix.

8. The one or more non-transitory, computer-readable media of claim 7, wherein the instructions, when executed, further cause the access point to: calculate the second beamforming matrix based on an inference that a change from the reference channel values to the updated channel values corresponds to a change from the first beamforming matrix to the second beamforming matrix.

9. An apparatus comprising:
   memory; and
   processing circuitry coupled with the memory, the processing circuitry to:
   store, in the memory, first channel information based on feedback from a plurality of stations of a wireless local area network in response to one or more reference signals;
   transmit a first multiuser packet to the plurality of stations based on the first channel information;
   process uplink transmissions received from the plurality of stations, wherein the uplink transmissions include first uplink transmissions and second uplink transmissions;
   determine a first uplink (UL) channel state based on the first uplink transmissions;
   determine a second UL channel state based on the second uplink transmissions;
   determine an UL channel state change based on the first UL channel state and the second UL channel state;
   determine a downlink (DL) channel state change based on the UL channel state change;
   determine second channel information based on the DL channel state change;
   store, in the memory, the second channel information; and
   transmit a second multiuser packet based on the second channel information,
   wherein the first channel information corresponds to a downlink channel within a first portion of a transmission opportunity and the second channel information corresponds to the downlink channel within a second portion of the transmission opportunity.

10. The apparatus of claim 9, wherein the processing circuitry is further to perform a sounding operation to acquire the downlink channel for the transmission opportunity.

11. The apparatus of claim 9, wherein the uplink transmissions includes user uplink data or includes acknowledgment information with respect to data transmitted in the first multiuser packet.

12. The apparatus of claim 9, wherein the processing circuitry is to set components of a receive chain to be in a first receive state to receive both the first and second uplink transmissions.

13. The apparatus of claim 9, wherein the processing circuitry is further to:
   generate first transmission parameters based on the first channel information; and generate second transmission parameters based on the second channel information.

14. The apparatus of claim 13, wherein the first transmission parameters includes a first beamforming matrix or coding rate and the second transmission parameters includes a second beamforming matrix or coding rate.

15. An access point having:
   application circuitry to generate application data to be transmitted to a plurality of stations;
   baseband circuitry coupled with the application circuitry to:
      acquire a downlink channel for a transmission opportunity;
      determine a first beamforming matrix based on a first state of the downlink channel as indicated in feedback information in multiuser beamforming reports received during acquisition of the downlink channel;
      generate a first multiuser packet to be transmitted using the first beamforming matrix;
      determine a change in an uplink channel based on a plurality of uplink transmissions;
      determine a second state of the downlink channel based on the change in the uplink channel;
      determine a second beamforming matrix based on the second state of the downlink channel; and
      generate a second multiuser packet to be transmitted using the second beamforming matrix; and
   a radio front end module to transmit the first and second multiuser packets within the transmission opportunity.

16. The access point of claim 15, wherein the plurality of uplink transmissions include first uplink transmissions and second uplink transmissions and the baseband circuitry is to:
   determine reference channel values based on the first uplink transmissions;
   determine updated channel values based on the second uplink transmissions; and
   determine the change in the uplink channel based on a comparison of the reference channel values to the updated channel values.

17. The access point of claim 15, wherein the baseband circuitry is further to control a receive chain of the radio front end module to receive the first and second uplink transmissions with a first receive state.

18. The access point of claim 15, wherein the baseband circuitry is further to:
   correlate the reference channel values to the first beamforming matrix; and
   calculate the second beamforming matrix based further on the correlation of the reference channel values to the first beamforming matrix.

19. The access point of claim 15, wherein the plurality of uplink transmissions include first uplink transmissions and second uplink transmissions and the baseband circuitry is to:
   determine reference channel values based on the first uplink transmissions;
   determine an updated reference channel values based on the second uplink transmissions; and
   determine the change in the uplink channel based on a comparison of the updated channel values to the reference channel values.

20. The access point of claim 19, wherein the first uplink transmissions include the multiuser beamforming reports.

* * * * *